United States Patent
Sarkar et al.

(10) Patent No.: US 10,755,199 B2
(45) Date of Patent: Aug. 25, 2020

(54) INTROSPECTION NETWORK FOR TRAINING NEURAL NETWORKS

(71) Applicant: Adobe Inc., San Jose, CA (US)

(72) Inventors: Mausoom Sarkar, New Delhi (IN); Balaji Krishnamurthy, Noida (IN); Abhishek Sinha, Ranchi (IN); Aahitagni Mukherjee, Bankura (IN)

(73) Assignee: ADOBE INC., San Jose, CA (US)

(*) Notice: Subject to any disclaimer, the term of this patent is extended or adjusted under 35 U.S.C. 154(b) by 679 days.

(21) Appl. No.: 15/608,517

(22) Filed: May 30, 2017

(65) Prior Publication Data

US 2018/0349788 A1 Dec. 6, 2018

(51) Int. Cl.
*G06N 20/00* (2019.01)
*G06F 7/02* (2006.01)
*G06N 3/08* (2006.01)
*G06N 3/04* (2006.01)

(52) U.S. Cl.
CPC .............. *G06N 20/00* (2019.01); *G06F 7/023* (2013.01); *G06N 3/0454* (2013.01); *G06N 3/084* (2013.01); *G06F 2207/4824* (2013.01); *G06N 3/0445* (2013.01); *G06N 3/0472* (2013.01)

(58) Field of Classification Search
None
See application file for complete search history.

(56) References Cited

PUBLICATIONS

Andrychowicz, et al., "Learning to learn by gradient descent by gradient descent", 30th Conference on Neural Information Processing Systems (NIPS 2016), Barcelona, Spain, Nov. 30, 2016, 17 pages.
Duchi, et al., "Adaptive Subgradient Methods for Online Learning and Stochastic Optimization*", Journal of Machine Learning Research 12 (2011), Jul. 2011, pp. 2121-2159.
Fu, et al., "Deep Q-Networks for Accelerating the Training of Deep Neural Networks", arXiv:1606.01467v3, Aug. 1, 2016, 11 pages.
Hinton, et al., "Lecture 6a:Overview of mini-batch gradient descent", 2012, Coursera lecture slides, available at http://www.cs.toronto.edu/~tijmen/csc321/slides/lecture_slides_lec6.pdf, 2012, 31 pages.
Jaderberg, et al., "Decoupled Neural Interfaces using Synthetic Gradients", arXiv:1608.05343v1, Aug. 18, 2016, 16 pages.
Kingma, et al., "Adam: A Method For Stochastic Optimization", arXiv:1412.6980v8, Jul. 23, 5, 15 pages.

(Continued)

*Primary Examiner* — Alan Chen

(57) ABSTRACT

An introspection network is a machine-learned neural network that accelerates training of other neural networks. The introspection network receives a weight history for each of a plurality of weights from a current training step for a target neural network. A weight history includes at least four values for the weight that are obtained during training of the target neural network up to the current step. The introspection network then provides, for each of the plurality of weights, a respective predicted value, based on the weight history. The predicted value for a weight represents a value for the weight in a future training step for the target neural network. Thus, the predicted value represents a jump in the training steps of the target neural network, which reduces the training time of the target neural network. The introspection network then sets each of the plurality of weights to its respective predicted value.

20 Claims, 10 Drawing Sheets

(56) References Cited

PUBLICATIONS

Krizhevsky, et al., "ImageNet Classification with Deep Convolutional Neural Networks", https://papers.nips.cc/paper/4824-imagenet-classification-with-deep-convolutional-neural-networks.pdf, 2012, 9 pages.
Krizhevsky, et al., "Learning Multiple Layers of Features from Tiny Images.", Apr. 8, 2009, 60 pages.
Qian, "On the momentum term in gradient descent learning algorithms", Neural Networks 12, 1999, pp. 145-151.
Rumelhart, et al., "Learning representations by back-propagating errors", Nature vol. 323, Oct. 9, 1986, pp. 533-536.
Russakovsky, et al., "ImageNet Large Scale Visual Recognition Challenge", International Journal of Computer Vision 115.3, 2015, pp. 211-252.
Sinha, et al., "Introspection: Accelerating Neural Network Training By Learning Weight Evolution." arXiv:1704.04959, Apr. 2017, 15 pages.
Szegedy, et al., "Going Deeper with Convolutions", Proceedings of the IEEE Conference on Computer Vision and Pattern Recognition, 2015, 9 pages.
Zeiler, "Adadelta: An adaptive learning rate method", arXiv:1212.5701v1, Dec. 22, 2012, 6 pages.

INTROSPECTION NETWORK FOR TRAINING NEURAL NETWORKS

TECHNICAL FIELD

This description relates to training of neural networks.

BACKGROUND

Neural networks, especially deep neural networks have been very successful in modeling high-level abstractions in data. Neural networks are computational models used in machine learning made up of nodes organized in layers. The nodes are also referred to as artificial neurons, or just neurons, and perform a function on provided input to produce some output value. A neural network requires a training period to learn the parameters, i.e., weights, used to map the input to a desired output. The mapping occurs via the function. Thus the weights are weights for the mapping function of the neural network. Each neural network is trained for a specific task, e.g., prediction, classification, encoding, etc. The task performed by the neural network is determined by the inputs provided, the mapping function, and the desired output. Training can either be supervised or unsupervised. In supervised training, training examples are provided to the neural network. A training example includes the inputs and a desired output. Training examples are also referred to as labeled data because the input is labeled with the desired output. The network learns the values for the weights used in the mapping function that most often result in the desired output when given the inputs. In unsupervised training, the network learns to identify a structure or pattern in the provided input. In other words, the network identifies implicit relationships in the data. Unsupervised training is used in deep neural networks as well as other neural networks and typically requires a large set of unlabeled data and a longer training period. Once the training period completes, the neural network can be used to perform the task it was trained for.

In a neural network, the neurons are organized into layers. A neuron in an input layer receives the input from an external source. A neuron in a hidden layer receives input from one or more neurons in a previous layer and provides output to one or more neurons in a subsequent layer. A neuron in an output layer provides the output value. What the output value represents depends on what task the network is trained to perform. Some neural networks predict a value given in the input. Some neural networks provide a classification given the input. When the nodes of a neural network provide their output to every node in the next layer, the neural network is said to be fully connected. When the neurons of a neural network provide their output to only some of the neurons in the next layer, the network is said to be convolutional. In general, the number of hidden layers in a neural network varies between one and the number of inputs.

To provide the output given the input, the neural network must be trained, which involves learning the proper value for a large number (e.g., millions) of parameters for the mapping function. The parameters are also commonly referred to as weights as they are used to weight terms in the mapping function. This training is an iterative process, with the values of the weights being tweaked over thousands of rounds of training until arriving at the optimal, or most accurate, values. In the context of neural networks, the parameters are initialized, often with random values, and a training optimizer iteratively updates the parameters, also referred to as weights, of the network to minimize error in the mapping function. In other words, during each round, or step, of iterative training the network updates the values of the parameters so that the values of the parameters eventually converge on the optimal values. Training is an iterative process that involves thousands of rounds, and sometimes hundreds of thousands of rounds, of updating the millions of parameters until the optimal parameter values are achieved. Training periods for neural networks can be long due to the number of weights to be learned and the size of the neural network. Training can take days and training of deep networks can even take weeks due to the size of the deep networks, the large number of parameters, and the size of the input datasets. To help speed training time, some neural networks use a training optimizer. The most widely used training optimizer is Stochastic Gradient Descent (SGD), although other optimizers, like Adagrad, Adadelta, RMSProp, and Adam, may also be used. Even with training optimizers, it can still take days to reach convergence, i.e., to train a neural network.

SUMMARY

An introspection network is a machine-learned neural network trained to predict a weight (i.e., a parameter) value at a future training step in the training of another neural network, i.e. the target neural network, given a history of the variance of the weight in previous training steps of the target neural network. The training of the target neural network is accelerated when the weight values at a current training step are set to the predicted values provided by the introspection network, effectively jumping the training of the target neural network forward several thousand training steps in terms of accuracy of the weight values. The introspection neural network, also referred to as just the introspection network for the sake of brevity, is trained using labeled training examples obtained from a plurality of weight histories generated during the training of a source neural network. Each weight history represents one of a plurality of weights in a sample set of weights for the source neural network. Each training example includes a value for the weight at a particular training step, and at least three other values for the weight for training steps that occur prior to the particular training step. The training example also includes a future value, which is a value for the weight at a training step that occurs subsequent to the particular training step. This subsequent training step may be several thousand training steps after the particular training step. The training examples are used to train the introspection neural network to predict the value at the future step given the values in the training example.

A trained introspection network can be used to accelerate training of a different neural network, referred to as the target neural network or just target network for the sake of brevity. The target neural network has many (e.g., millions) of weights to be learned over several thousand (or more) training rounds. After a first period of training for the target neural network, a weight value history sample for each of the weights of the target neural network is obtained. The introspection network provides a respective predicted value for each of the plurality of weights in the target network using the weight value history samples. When the weight values of the target network are set to respective predicted values provided by the introspection network, the target network effectively jumps forward to the future training step in terms of accuracy of the weight value. Thus, while additional training occurs in the target network, fewer training steps are needed to reach convergence in the target network. This results in hours or even days of processing time saved. Thus, using the introspection network to train a target neural network reduces the amount processing time normally needed to train the target neural network to reach the optimal parameter values for the target neural network. This results in a faster, more efficient process to train the target neural network. In this manner, the target neural network is enabled to start performing its designated task much faster than without using the introspection network.

The details of one or more implementations are set forth in the accompanying drawings and the description below. Other features will be apparent from the description and drawings, and from the claims.

DETAILED DESCRIPTION

Figure 1:
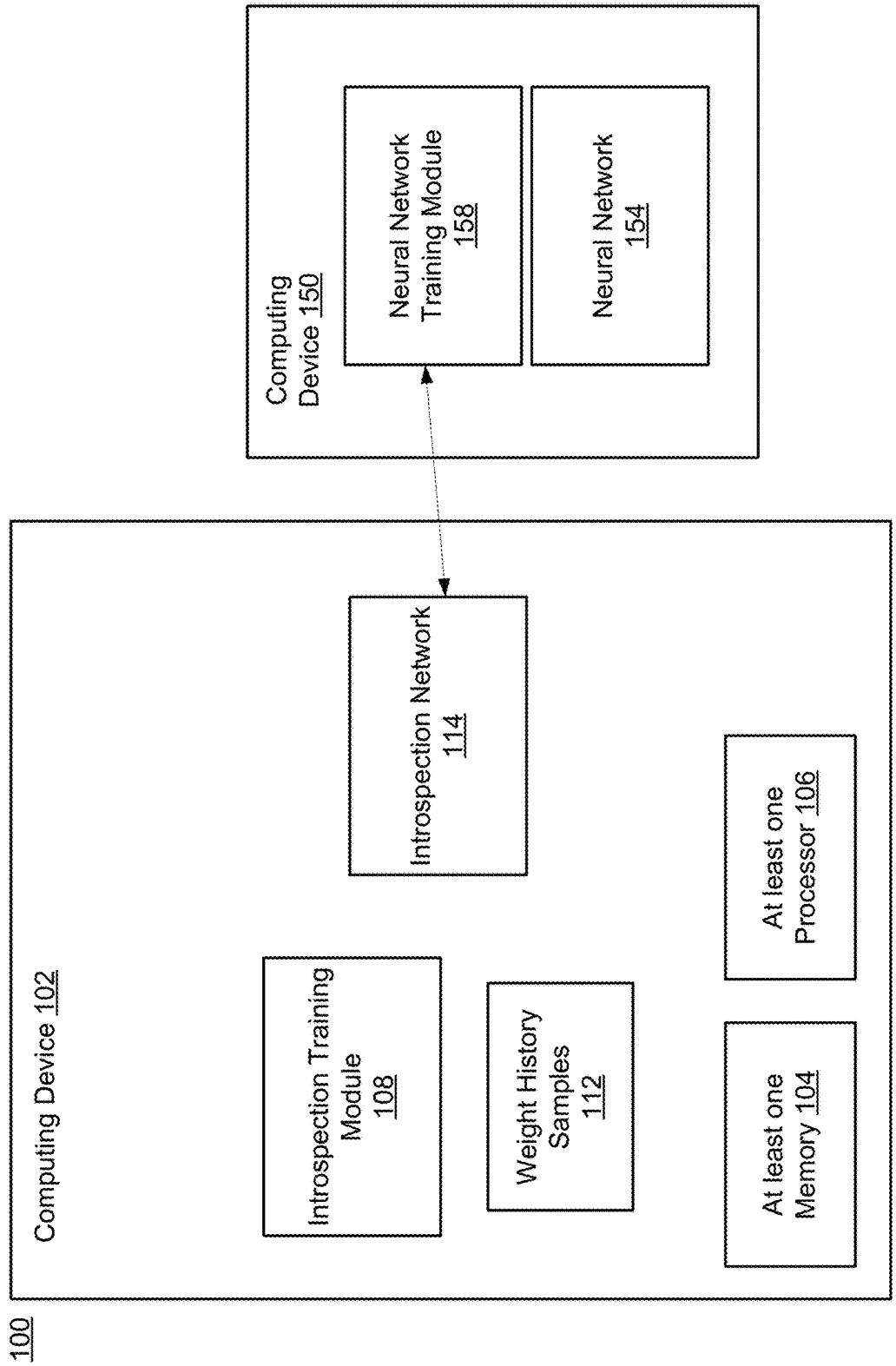
FIG. 1 is a block diagram of a system for accelerating training of a neural network using an introspection network, according to an implementation.

Systems and methods train a machine-learned introspection network to predict weight (i.e., a parameter) values for training another neural network given a history of the variance of the weight values in previous training steps. Systems and methods use the introspection network to predict weights that are used during training of another neural network. The other network trained using the introspection network is referred to as the target neural network or just target network. Thus target network and target neural network both refer to a neural network to be trained using application of the introspection network at one or more training steps. The history of a weight may include the weight value at as few as four previous training steps. The introspection network propels training of the target network by enabling the target network to reach convergence (complete the training phase) with fewer training rounds, which can represent a savings of hours or days of computer processing time. The introspection network has a low memory footprint and can be used in conjunction with other optimizations. The introspection network can be used to accelerate training of different target networks, e.g., with different inputs, different configurations, different tasks, without retraining.

In some implementations the introspection network is a simple 1-layered feedforward neural network with four input neurons. An introspection network with this configuration has a low memory footprint. In some implementations the introspection network may have a more complex configuration, e.g., additional input neurons, additional layers, etc. The introspection network is a neural network that is trained via machine-learning on weight evolution trends of a first neural network (i.e., the source neural network) to predict or forecast the future value of a scalar weight given a history of the weight over several training steps in the first network. The source network is a neural network that provides, during its own training period, the data used to generate training examples for the introspection network. The source neural network is also referred to as just the source network for the sake of brevity. The scalar weight may also be referred to as a parameter. The weights are parameters that a neural network uses in its mapping function to provide an output value given the inputs. Once trained, the introspection network can then be used to accelerate the training of an unseen network, or target network, by predicting the value of the weights several thousand steps into the future. The target network is another neural network being trained using the introspection network. When the current values of the weights in the target network are set to the predicted values of the weights provided by the introspection network, this enables the target network to reach convergence in far fewer training steps. In other words, applying the predicted values obtained from the introspection network to the values of the weights in the target network makes the training of the target network jump forward several thousand training steps in terms of accuracy of the weight values.

Large neural networks, such as deep learning networks, can take days or weeks to train. The use of an introspection network can reduce the training time by days because convergence can be achieved in fewer rounds of training, making such networks suitable for tasks previously impossible due to the length of training time. In addition, the introspection network can be used in conjunction with other optimization techniques, such as SGD and Adam, to further accelerate training of the target network. Moreover, the introspection network does not need to be trained on the same input dataset or on the same task as the target network—thus the introspection network can be used for networks having various classification tasks and inputs without retraining. Details of the systems and techniques are discussed below with respect to the illustrated figures. The introspection network is computationally efficient because it need not be used at every training step. In other words, the introspection network can be used at a single step, two steps, three steps, etc. during the training of the other network.

FIG. 1 is a block diagram of a system 100 for training a neural network in an accelerated manner. The system 100 includes a computing device 102 having at least one memory 104, at least one processor 106, and one or more modules, such as introspection training module 108. The computing device 102 may communicate with one or more other computing devices, e.g., computing device 152 over a network (not shown). The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network.

The at least one processor 106 may represent two or more processors on the computing device 102 executing in parallel and utilizing corresponding instructions stored using the at least one memory 104. In some implementations, the at least one processor 106 may be a specialized processor, e.g. a graphics processing unit (GPU). The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as one or more of the objects generated by the introspection training module 108 and its components.

The introspection training module 108 may be configured to generate weight history samples 112 and use the samples 112 to train an introspection network 114 to predict weights during training of another neural network. A weight history represents the evolution of a scalar weight value of a neural network at different points in the training of the network. In the context of neural networks, a training optimizer iteratively updates the weights during training, which occurs in several rounds, e.g., thousands of rounds. The network is typically trained until the weights reach convergence, e.g., the neurons of the network reach similar conclusions. Once the weights reach convergence, the network is said to be trained and ready to make classification predictions, or whatever other task the network was trained for. Thus, the history of a weight includes its starting value and its value at various straining steps. In some implementations the history may include the weight at all training steps. The introspection training module 108 may be configured to store the weight history of the weights used to train a neural network (not shown) to perform some task, e.g., classification, using an input dataset. The neural network used to generate the weight histories may be referred to as the first network or the source network, because it is the source of the weight histories.

The particular configuration of the source network is unimportant to the weight histories. The source network can be a fully connected network, a convolutional network, or some combination of these. The source network may also include any number of hidden layers. The source network may also have any optimization rules. The source network may also be trained to perform any task, e.g., any type of classification. The specific task the source network is trained to perform, as well as the layer to which a weight belongs to, does not affect the weight evolutions demonstrated in the weight histories obtained via the training of the source network. The weight evolution can be measured by the difference between the final and initial values. The weight evolution can also be measured by oscillations, e.g., the square root of the $2^{nd}$ moment of the values a weight scalar takes during training. In general, a major proportion of weights do not undergo significant change during training, as measured by either the difference or by the oscillations.

For those that do undergo a significant change, the weights follow a trend, or in other words increase or decrease in a predictable fashion. Thus, the introspection training module 108 can use the weight histories to train a neural network to predict a future weight value given a partial history of the weight value. The neural network is referred to as an introspection network because it looks at the weight evolution during training. The introspection training module 108 generates training examples from the weight histories collected during training of the source network.

In some implementations, to reduce the size of the training examples for the introspection network and, therefore, to reduce training time, the introspection training module 108 may generate a sample set of training examples from the weight histories. The sample set includes training examples representing less than all of the weights in the weight histories. In some implementations, the sample set may include a higher proportion of weights with high variability. In other words, there are many more weights that do not change much during training, but these are less informative as training examples. Therefore, in some implementations, the introspection training module 108 may generate more training examples from weights with higher variability than these weights represent as a percent of the total number of weights.

The introspection training module 108 may sort the weight histories by decreasing order of variations. The variation may be measured as the difference between the initial value of the weight and the value at training step t (also referred to as time t). Training step t may also be referred to as a jump step, because when the introspection network 114 is used to train another neural network (e.g. neural network 154) at step t, the other neural network jumps ahead in terms of accuracy as a result. The introspection training module 108 may select training examples from the sorted histories. In some implementations, the introspection training module 108 may select half of the training examples from the weight histories in the top $50^{th}$ percentile of the sorted histories. In other words, half of the training examples are taken from histories that have a high variance, i.e., in the $50^{th}$ percentile. In some implementations, the introspection training module 108 may select the next quarter of training examples from the $50^{th}$ to the $75^{th}$ percentile and the remaining training examples from the bottom quartile (e.g., $75^{th}$ percentile or less). Of course, other methods may be used to select training examples.

A training example for the introspection network 114 includes at least four values for a particular weight. In some implementations, one of the values may be the value at step t or a step within a few steps of t. The step t is selected at random. The four weight values represent a history or an evolution of the weight up to step t. The remaining values in the history are selected from steps prior to t. Step t can be any step in the training process. In some implementations, the value of the weight at time zero (0), e.g., the initial value, may be one of the at least four values. In some implementations, the values may be selected at some interval before step t. In some implementations, the intervals may be equally spaced. In some implementations, the intervals may be unequal. For example, the intervals may be the value of the weight at step 0, step 4t/10 and 7t/10. Other intervals are possible. The training example may include more than four values to represent the history for the weight. In addition to the history of the weight, the training example also includes a value of the weight at step kt, where k is any number greater than one (1). In some implementations, k is two (2). The value of the weight at step kt represents the predicted or forecasted value of the weight. In other words, the introspection network 114 is trained through backpropagation to predict the given value of the weight at step kt given the weight history (e.g., the weight history at time t, time 7t/10, time 4t/10, and time 0).

In some implementations, because the values of the weights are very small fractions, the introspection training module 108 may multiply the values of the weights in a training example by a scaling factor. In some implementations, the scaling factor may be 100. In some implementations, the scaling factor may be 1000. In some implementations, the introspection training module 108 may apply the scaling factor before the weights are provided as input into the introspection network 114. In some implementations, the scaling factor may be applied as the introspection training module 108 is generating the training example. The number of training examples is large, e.g., around 800,000.

In some implementations, the introspection network 114 may be trained using an optimizer, e.g., Adam optimizer. In some implementations, the introspection network 114 may be trained in mini-batches, e.g., with a mini batch size of 20. In some implementations, the introspection network 114 may use an L1 error function. In some implementations, the introspection network 114 may use another loss function, e.g., L2 error or percentage error. The training may include tens of thousands of steps. In some implementations, the introspection network 114 is trained in 30,000 steps. In some implementations the training may occur until the prediction error is small, e.g., 0.004 or less.

Once the introspection network 114 is trained, the introspection network 114 may be used to train any unseen neural network. The unseen neural network may be referred to as a target network. Neural network 154 is an example of a target network. In some implementations the target network may be on a separate computing device, e.g., computing device 150, than computing device 102 and the introspection network 114 may be provided to the computing device 150 or the computing device 150 may access the introspection network 114 remotely. In some implementations, the target network may be trained on the same computing device as the introspection network 114. In some implementations, the trained introspection network 114 may be offered to the computing device 150 from a marketplace. The marketplace may offer software as a service items. The introspection network 114 may be offered as a software as a service item.

The target network, e.g., neural network 154, can have any configuration. For example, the neural network 154 may be a convolutional network. The neural network 154 may be a fully connected network. The neural network 154 may have any number of hidden layers. The neural network 154 may be a deep neural network. The neural network 154 may be a Recurrent Neural Network. The neural network 154 may be an autoencoder network. The neural network may be a multi layer perceptron. The neural network 154 may be a Boltzman Machine. The neural network 154 may be a Restricted Boltzman Machine (RBM). In some implementations a neural network training module 158 may be configured to use the introspection network 114 at specific training steps, i.e., jump steps, when training the neural network 154. The selection of the training steps at which the introspection network 114 is to be used depends on the distribution of the training steps t used for training the introspection network 114. Jump steps that occur later provide a better increase in accuracy than earlier ones, e.g., after the first few thousand training steps. The neural network training module 158 may record weight histories at the same intervals for which the introspection network 114 was trained. For example, if the introspection network 114 was provided a history with four values, one at time t, one at time 7t/10, one at time 4t/10, and one at time zero, the introspection network 114 may record the weight values of each weight at these four times for each jump step. If there is a jump step at t=7000, t=8000, and t=10,000, the neural network training module 158 records weight values for each weight at t=0, t=2800, t=3200, t=4000, t=4900, t=5600, t=7000, t=8000, and t=10,000.

When the training of the neural network 154 reaches a jump step, the system may use the introspection network 114 to provide a forecast of each weight of the neural network 154 before starting the next training step. The value of each weight is set to its respective forecasted weight before starting the next training step. In some implementations, the introspection network 114 may do the forecasting in batches. In other words, subsets of the weights may be run through the introspection network 114 until all weights have been processed by the introspection network 114. This process may be repeated for each jump step. Although it takes some processing time to forecast a value for each weight, the processing time consumed in forecasting is far less, by many orders of magnitude, than the processing time needed to reach convergence without using the introspection network 114. Indeed, using the introspection network 114 can reduce the number of training steps by half (where k≈2 while still maintaining the accuracy, as demonstrated by FIGS. 5-8. Thus, for example, although it may take 35 seconds to compute the weight forecasts at a jump step, this may save days or even weeks of training time, depending on the configuration of the target network and architecture used to train the target network.

Figure 2:
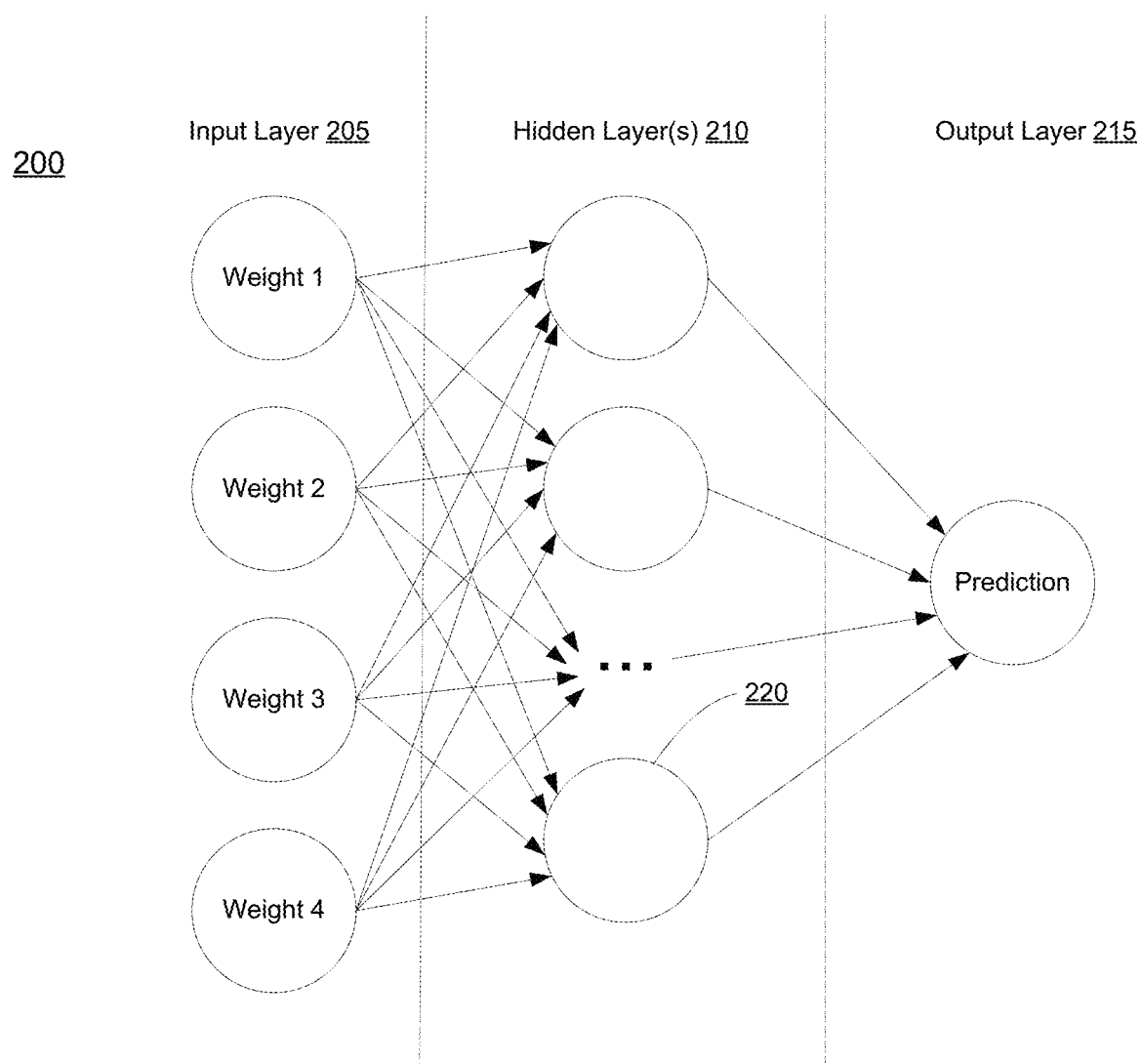
FIG. 2 is a block diagram of an example introspection network, according to an implementation.

FIG. 2 is a block diagram of an example introspection network 200, according to an implementation. The example network 200 is one example of the introspection network 114 of FIG. 1. Other implementations may include a configuration different from the configuration described by network 200. For example, other implementations may include additional inputs, additional hidden layers, or additional nodes in the hidden layers. Such additional hidden layers may be fully connected or convolutional.

In the example network 200 of FIG. 2, the introspection network has an input layer 205, one hidden layer 210 and an output layer 215. The input layer 205 includes four inputs. The four inputs represent an evolution or history of the values of a weight scalar. For example, the weight 1 may be the weight at a training step t. The weights 2 to 4 may be values of the weight at previous steps. Weight 4 may be an initial value for the weight. Weights 2 and 3 may be values at some interval between the initial value and the value at time t. For example, the step t may be 7000 and weight 2 may represent the value of the weight at step 2800 and weight 3 may represent the value of the weight at step 4900. Of course other intervals may be used. In some implementations the input may have been multiplied by a scaling factor. For example, a weight with a value of 0.00045 may be multiplied by 100 or by 1000 before being provided as input to the network 200.

The network 200 also includes one hidden layer 210. The hidden layer 210 can include a number of neurons 220, e.g., 40 neurons. Each neuron 220 receives the input from the input layer 205. In other words, the neurons 220 are fully connected to the input layer 205. In some implementations the neurons 220 may be rectified linear units (ReLU). In other words, the hidden layer 210 may have ReLU activation. The output layer 215 is a single neuron that outputs the predicted future value of the weight. Because the example network 200 only includes one hidden layer, the memory footprint is reduced and the network 200 executes very fast.

Figure 3:
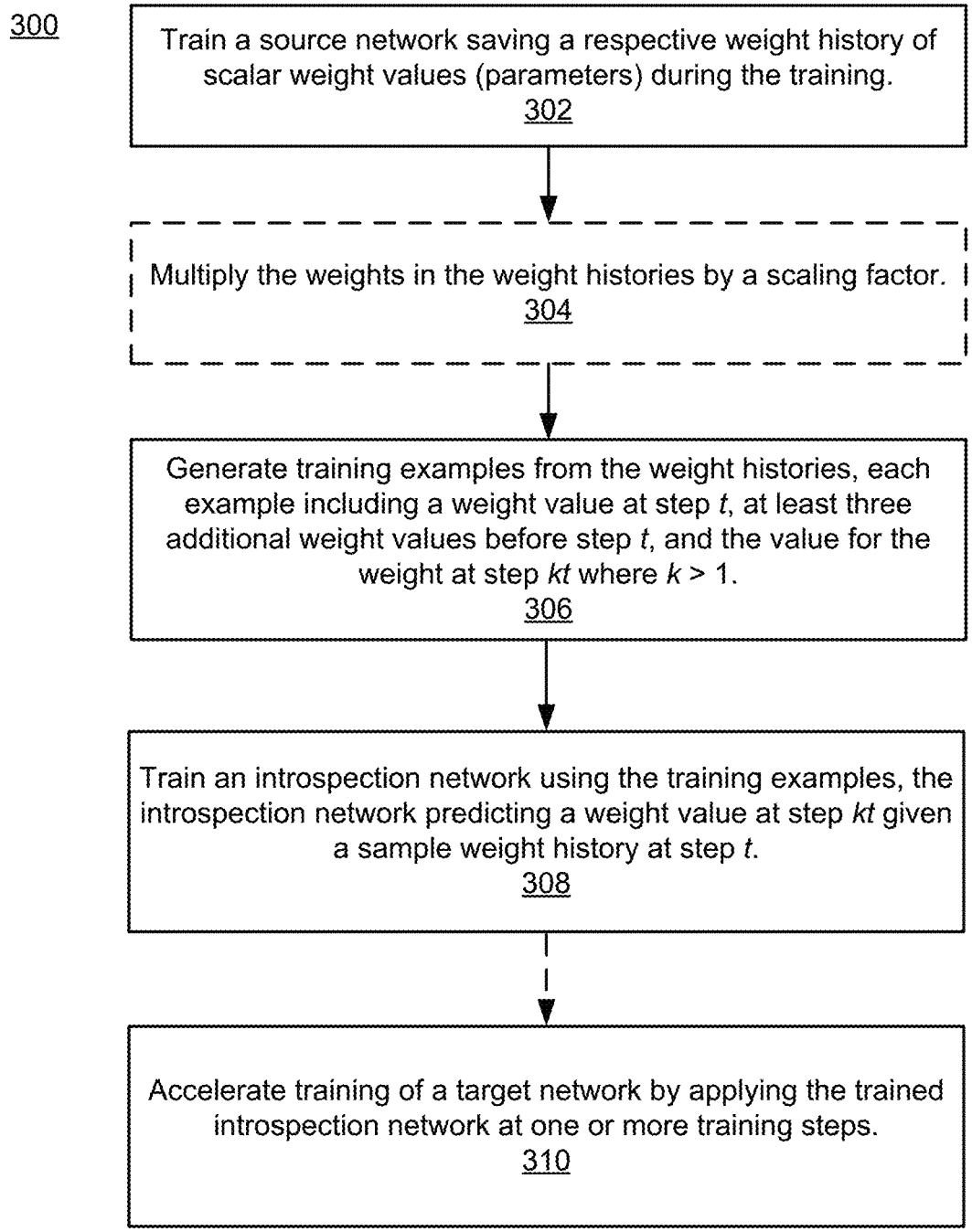
FIG. 3 is an example flowchart illustrating example operations of the system of FIG. 1.

FIG. 3 is an example flowchart illustrating an example process 300 performed by the system of FIG. 1. Process 300 may be performed by a system such as system 100 of FIG.

1. Process 300 trains an introspection network to predict weight values for training a target neural network. Process 300 uses the introspection network to predict weight values of the target neural network during training of the target neural network to reduce the training time of the target neural network.

Process 300 includes training a first neural network and, during the training, saving weight histories (302) of the scalar weights (parameters) used in the network. The weights may be from any layer during a training step. The weight histories include values for all weights. The history for a particular weight includes the values of the weight at each step. In some implementations, the history always includes an initial value for the weight. The first or source network can have any number of configurations. For example, the source network can be a neural network with three convolutional layers and two fully connected layers. The source network may also have ReLU activation. The source networks may deploy an optimizer, such as Adam or SGD. The source network can have any input data set and be trained for one or more classification tasks. The particular configuration of the source network is not of particular importance, nor is the classification task. In some implementations, the system may multiply the weight histories by a scaling factor (304). For example, the values of the weights may be small fractions. The scaling factor may depend on attributes of the source network. In some implementations, the scaling factor may make the value a number greater than one. In some implementations, the scaling factor may make the value a number 0.01 or greater. The scaling factor may be 1000. Multiplying the weight values is optional and may be skipped in some implementations.

Process 300 also includes generating training examples from the weight histories (306). A training example includes at least four weight values that represent an evolution or history of the weight up to step t, and a value for the weight at step kt, where k is greater than one (1). The four weight values include the value at step t. In some implementations, the four weight values may also include the initial value, e.g., the value before any training steps. The particular intervals from which values are taken before t can be any intervals, but need to be consistent across all weights. In other words, if a first weight has the intervals of t, 7t/10, 4t/10, and 0t, all other weights are sampled at the same intervals. Because the introspection network can operate on four inputs, it has a small memory footprint. While additional inputs may be used, each additional input increases the memory footprint of the introspection network.

The number of training examples may be far less than the number of weights used in training the source neural network. For example, the system may sort the histories in descending order of variance between the initial value and the value at time t. The system may take half of the training examples from histories that fall in the top $50^{th}$ percentile of the sorted list. This ensures that the system is trained with an adequate number of examples of weights that change value during training. A high percentage of the weights in the first neural network may not change much during training. These will be in the bottom $50^{th}$ percentile. In some implementations a quarter of the training examples are taken between the $50^{th}$ and $75^{th}$ percentiles and the remainder of the training examples are taken from the bottom quartile. The training examples may be selected with random steps t within the percentiles described above.

The system may use the training examples to train the introspection network to predict a future weight value, e.g., at step kt, given the weight history represented in the training example (308). In some implementations, the training may occur in a number of steps, e.g., 8000 training steps. In some implementations, the training may occur until a parameter representing convergence is reached. Once the introspection network is trained, it may be used to guide the training of second neural networks (310). The second neural networks may be referred to as a target networks. A target neural network may be a deep neural network. The target network may have an entirely different configuration and/or architecture than the source network. The target network may also perform an entirely different task than the source network and may use entirely different inputs (datasets). In other words, the introspection network is not limited to use on specific inputs or specific tasks, which makes the introspection network more flexible than other optimization methods, such as Deep-Q.

In some implementations, weight histories from different networks (e.g., two or more source neural networks) may be combined into the training set. In some implementations, weight histories from a different network may be used to further train an introspection network already trained on a first source network. Adding weight histories from different types of networks enables the introspection network to adapt to new types of networks. In other words, the introspection network can be adapted to generalize to different types of neural networks.

Figure 4:
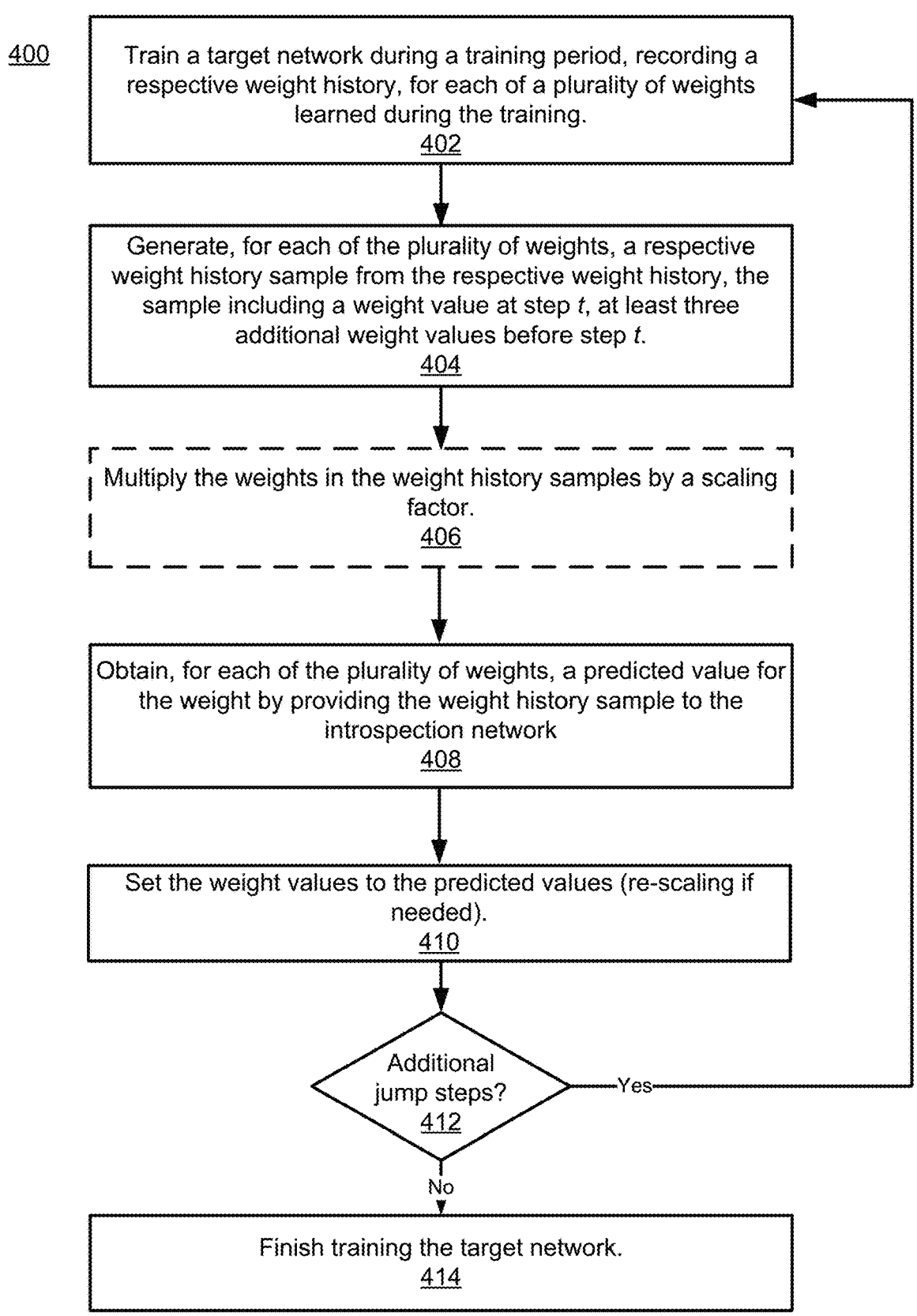
FIG. 4 is an example flowchart illustrating example operations of the system of FIG. 1.

FIG. 4 is an example flowchart illustrating an example process 400 performed by the system of FIG. 1. Process 400 may be performed by a system such as system 100 of FIG. 1 to train a target network using the introspection network, e.g., as part of step 310 of FIG. 3. Process 400 may be repeated for many different target networks with the same introspection network.

Process 400 includes training a target network for a first training period and, during the training, saving weight histories (402) of the scalar weights (parameters) used in the target network. The weights may be obtained from any layer of the target network during a training step. In some implementations, only weights from certain designated steps are obtained. The intervals or steps at which weights are stored are known before training the target network begins. For example, before training the target network, the system may be configured to apply the introspection network at time t, and may save weights at time 0, at time 4t/10, at time 7t/10, and time t. These intervals are used as examples but implementations are not limited to these particular intervals. The number of steps at which weights are saved depends on the number of inputs to the introspection network and the steps or times t at which the introspection network is applied during the training.

The history for a particular weight includes the values of the weight at the designated steps. In some implementations, the history always includes an initial value for the weight, e.g., prior to training. The target network can have any number of configurations, and can be a non-linear neural network, a deep neural network, recurrent neural network, an Autoencoder, a Bolzman Machine, a Restricted Boltzman Machine, a multilayer perceptron, or any other neural network. The neural network can be convolutional, fully connected, or a combination of these. The target network may also have ReLU activation. The target network may deploy an optimizer, e.g., Adam, SGD, etc. The target network can have any input data set and be trained for one or more classification tasks. The particular configuration of the target network is not of particular importance, nor is the classification task. In other words, the target network need not be for the same input data set, have the same configuration, nor have the same task that the introspection network was trained on (i.e., the source network). In some implementations, the system may use batch normalization during training of the target network.

At some step t, the first training period ends and the system applies the introspection network to the weights. The system may generate, for each of the plurality of weights, a respective weight history sample from the weight history for the weight (404). The weight history sample includes at least four weight values that represent an evolution or history of the weight up to step t. The four weight values include the value at step t. In some implementations, the four weight values may also include the initial value, e.g., the value before any training steps (e.g., at step 0). The particular intervals from which values are taken before t can be any intervals, but need to be consistent with the intervals which the introspection used during training. In other words, if the introspection network was trained with the intervals of t, 7t/10, 4t/10, and 0t, the weight history sample uses the same intervals to select the weight values. Of course if the introspection network was trained with more than four inputs, the weight history sample for a weight includes more than four values as well. The system generates a respective weight history sample for each of the plurality of weights of the target network. This may be millions of weights.

In some implementations, the system may multiply the weight history samples by a scaling factor (406). For example, the values of the weights may be small fractions. In some implementations, the scaling factor may make the weight value a number greater than one. In some implementations, the scaling factor may make the value 0.01 or greater. The scaling factor may be 1000. Multiplying the weight values is optional and may be skipped in some implementations. When the scaling factor is used to train the introspection network it is also used when applying the introspection network.

The system may obtain, for each of the plurality of weights, a predicted value for the weight by providing the weight history sample for the weight to the introspection network (408). The introspection network is trained to provide the predicted value given the weight history sample. The predicted value is the predicted value of the weight at step kt. Because k is some future step in training, application of the introspection network allows the training of the target network to jump ahead in the training so that the training can be accomplished k-times faster without a loss (and in some cases an increase) in accuracy. The obtaining of predicted values may be done in batches, e.g., batches of 50. While it does take some processing time to put all of the weights (i.e., the plurality of weights) through the introspection network, this processing time is negligible in comparison to the processing time saved by jumping ahead (e.g., to step kt) in the training process.

Once predicted values for the plurality of weights are obtained, the process 400 includes setting each of the weight values to its respective predicted value (410). If the system multiplied the weight values by the scaling factor, the system may divide the predicted value by the scaling factor before setting the weight value to the predicted value. In other words, if the system increases the weight histories by the scaling factor, the system may also reduce the predicted values by the scaling factor. The system then determines whether additional jump steps are to be performed (412). Additional jump steps are optional but will help the target network achieve convergence even faster. If additional jump steps are to be included (412, Yes), steps 402 to 410 are repeated for a second training period. The second training period need not be as long as the first training period. For example, the first training period may be 3000 or 7000 steps but the second training period may be 1000 steps. A third training period may be 2000 steps, etc. In some implementations the system may perform 3 or 4 jump steps, but implementations may use any number of jump steps. Once all jump steps have been applied (412, No), the system finishes the training of the target network (414). As illustrated by FIGS. 5 to 8 below, this may include reaching convergence in fewer training steps. Also as illustrated by FIGS. 5 to 8, the training may performing all training steps but achieve higher accuracy than without application of the introspection network.

The introspection network can be used in conjunction with other optimization methods when training the target network. For example, SGD optimizations (and its extensions) reduce convergence time by suitably altering the learning rate during training. In SGD optimizations, the weight update is always a product of the gradient and the modified/unmodified learning rate at every training step. In contrast, the introspection network updates weights independently of the current gradient. Instead, the introspection network uses weight history to predict a future value many steps ahead. Moreover, the introspection network generalizes between different architectures and datasets without additional retraining. The introspection network can also be employed asynchronously, i.e., at specific weight updates rather than at every weight update. This makes the introspection network computationally efficient. It also enables the introspection network to be used in distributed deep learning scenarios by deploying the introspection network on a parameter server that guides the deep learning network.

Figure 5:
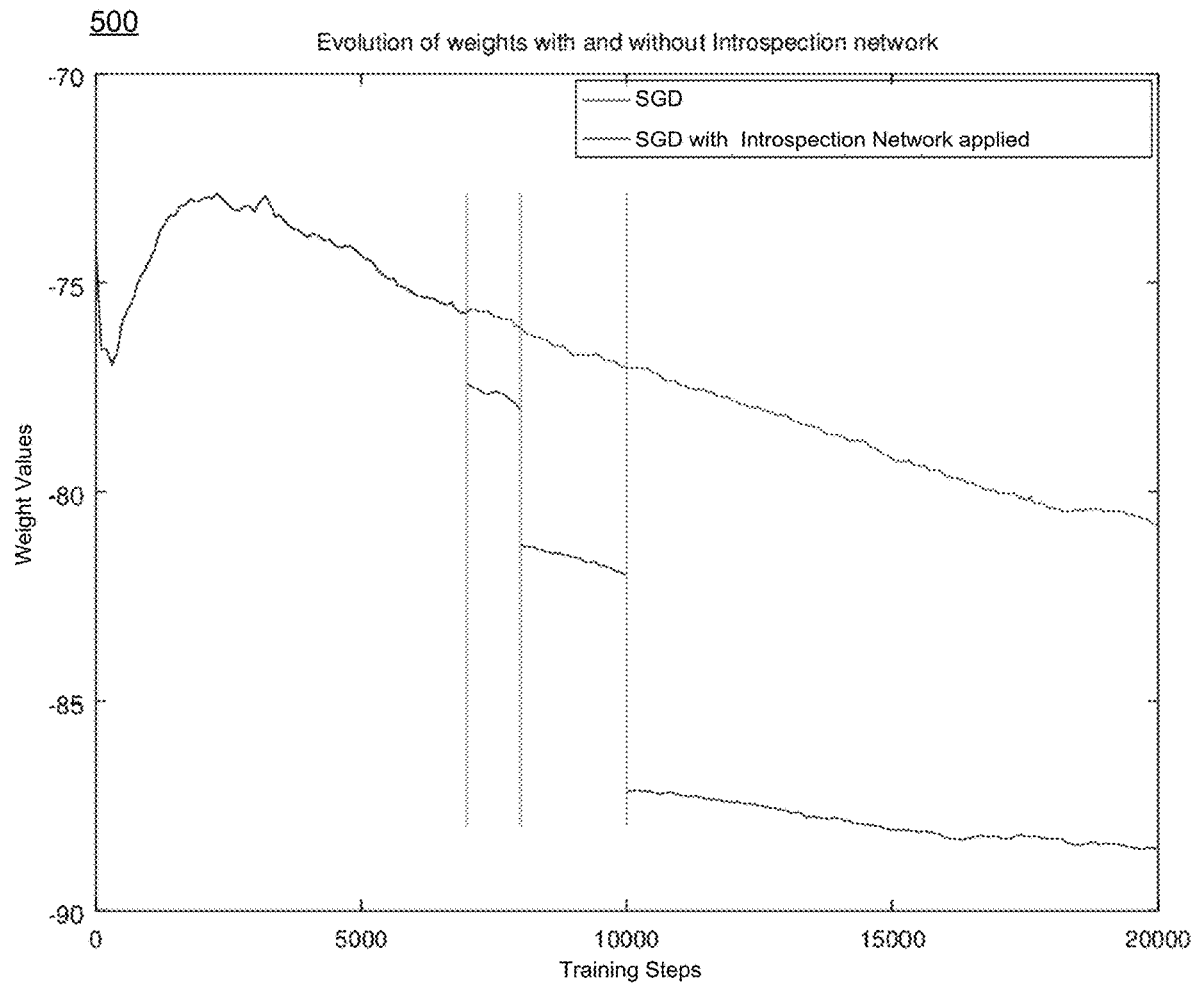
FIG. 5 is a graph comparing weight evolution for a single scalar weight with and without an introspection network, according to one example.
Figure 6:
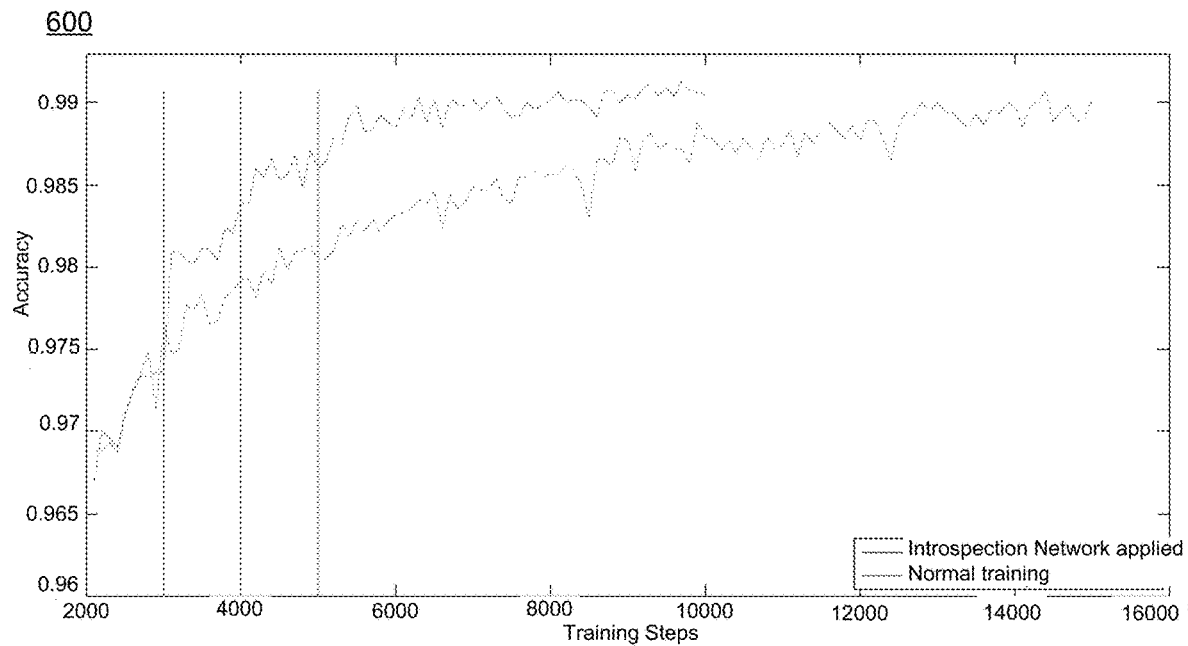
FIGS. 6, 7, 8, and 9 are graphs comparing the validation accuracy of different network configurations trained in the presence and absence of introspection, according to one example.

FIG. 5 is a graph 500 comparing weight evolution for a single scalar weight with and without an introspection network, according to one example. In the graph 500 the introspection network was used at training steps 7000, 8000, and 10000, illustrated in the graph by the vertical lines. The y-axis represents weight values and the x axis represents the training steps. The jump in the weight values using the Introspection network demonstrates that the prediction provided by the introspection network moves the weight evolution several steps into the future. For example, just after step 7000, the weight values for the training that includes the introspection network are already at values it takes the training with SGD alone until step 12500 to reach. Similarly, after training step 8000 (a second jump using the introspection network), the weight values have already reached the values that training with SGD alone has not yet reached at 20,000 steps. Thus, graph 500 demonstrates that training time with the introspection network can be reduced significantly over training with other types of optimizers alone. This can represent days or even weeks of training time. FIG. 5 represents data from a convolutional network being trained on the MNIST handwritten digit classification task.

FIGS. 6, 7, 8, and 9 are graphs comparing the validation accuracy of different network configurations trained in the presence and absence of introspection, according to one example. In the examples of FIGS. 6-9, the same introspection network is used. The introspection network used in FIGS. 6-9 was trained on weight evolutions of the MINST network. In the graph 600 of FIG. 6, the introspection network was used at training steps 3000, 4000, and 5000. The target network being trained for graph 600 is a convolutional neural network with two convolutional layers and two fully connected layers with ReLU activations for classification on the MNIST image dataset. In training the target network for graph 600, max pooling was applied after every convolutional layer. The convolutional layer weights have the shape [5, 5, 1, 8] and [5, 5, 32, 64] and the fully connected layers were of sizes [3136, 1024] and [1024, 10]. The weights were initialized from a truncated normal distribution with a mean of 0 and std of 0.01. The target network for graph 600 was trained using SGD with a learning rate of 1e-2 and a batch size of 50. Convergence with just the SGD optimizer took 20,000 steps. At 20,000 steps, the training of the target network using the introspection network reached a validation accuracy of 98.22 percent. In the same number of steps without the introspection network, validation accuracy was 97.22 percent. The gain in accuracy with the application of the introspection network translates to real gains in training times.

Figure 7:
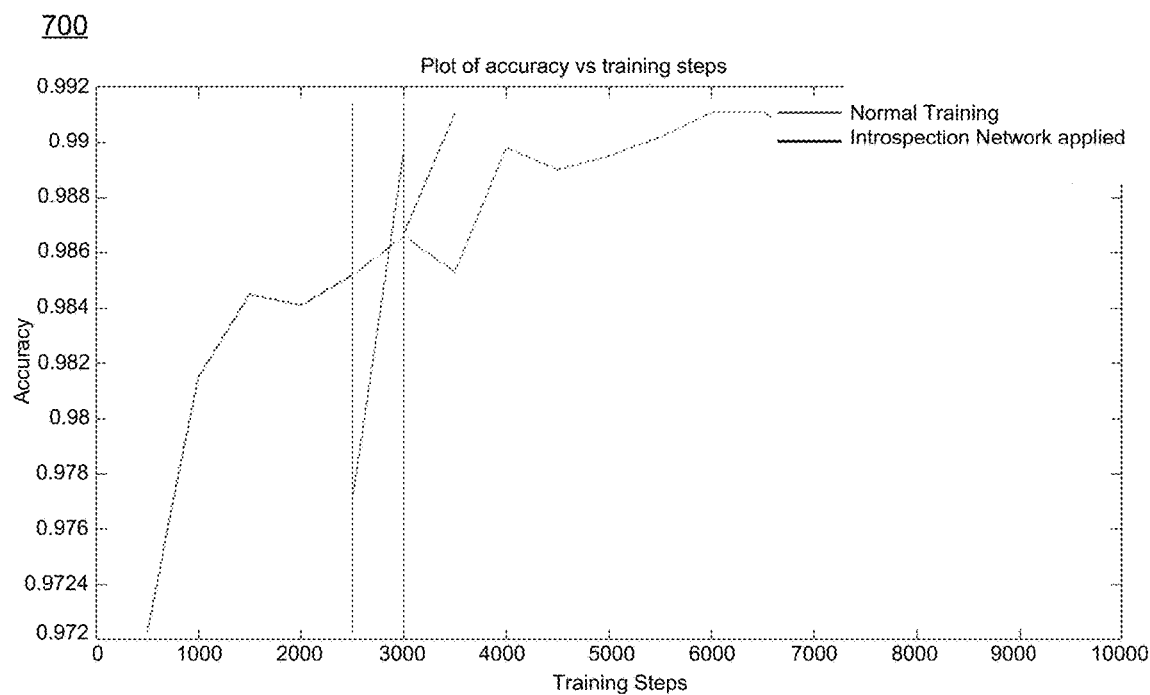

In the graph 700 of FIG. 7, the introspection network was used at training steps 2500 and 3000. The target network being trained for graph 700 is a convolutional network with two convolutional layers and two fully connected layers with ReLU activations for classification on the MNIST image dataset. Max pooling was applied after every convolutional layer. The convolutional layers were of the shape [5, 5, 1, 20] and [5, 5, 20, 50] and the two fully connected layers were of sizes [800, 500] and [500, 10]. The weights were initialized via xavier initialization. The learning rate was 0.01 which was decayed via the inverse policy with gamma and power being 13-4 and 0.75 respectively. The batch size was 61 and it took approximately 10000 steps for convergence. FIG. 7 illustrates an initial drop in accuracy after the application of the introspection network at step 3000. This drop can be attributed to prediction of each weight scalar independently, which does not account for the interrelationship between the weight scalars in a layer or across different layers. However the interrelationship is soon reestablished after a few SGD steps, and the accuracy outperforms SGD alone. The graph 700 shows that an accuracy of 99.11 percent is not reached until training step 6000 with SGD alone, whereas this accuracy is reached after only 3500 steps with two applications of the introspection network. Similar results were seen on other configurations (e.g., a recurrent neural network (RNN) having a LSTM (long short-term memory) cell of hidden size of 128 followed by a fully connected layer of shape [128, 10] for classification.

Figure 8:
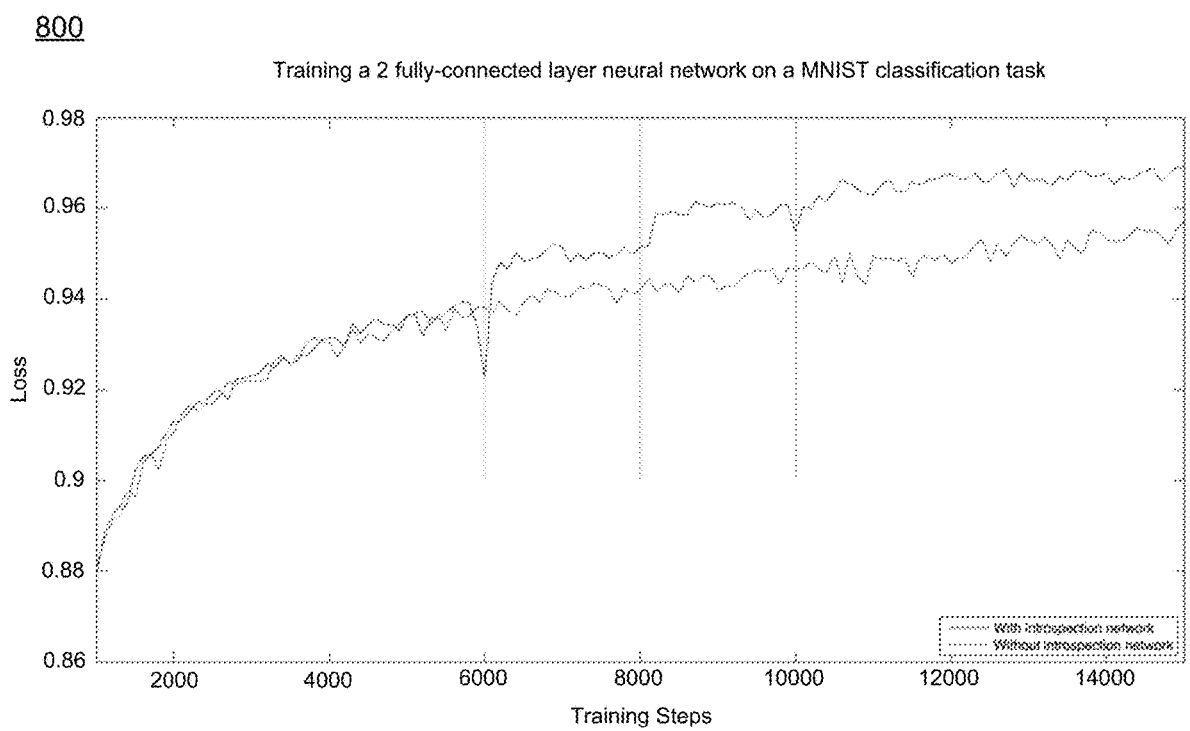

In the graph 800 of FIG. 8, the introspection network was used at training steps 6000, 8000 and 10000. The target network being trained for graph 800 is a fully connected neural network with two hidden layers with 256 hidden units having ReLU activations for classification on the MNIST image dataset. The target network being trained in graph 800 uses SGD optimization with a learning rate of 5e-4, a batch size of 128, and batch normalization. FIG. 8 illustrates that maximum accuracy achieved by training the target network without introspection is reached after 15000 steps. The maximum accuracy is 95.71%. In contrast, the training of the target network with introspection achieves this accuracy after only 8300 steps. FIG. 8 further illustrates that the maximum accuracy achieved with introspection is 96.89%.

Figure 9:
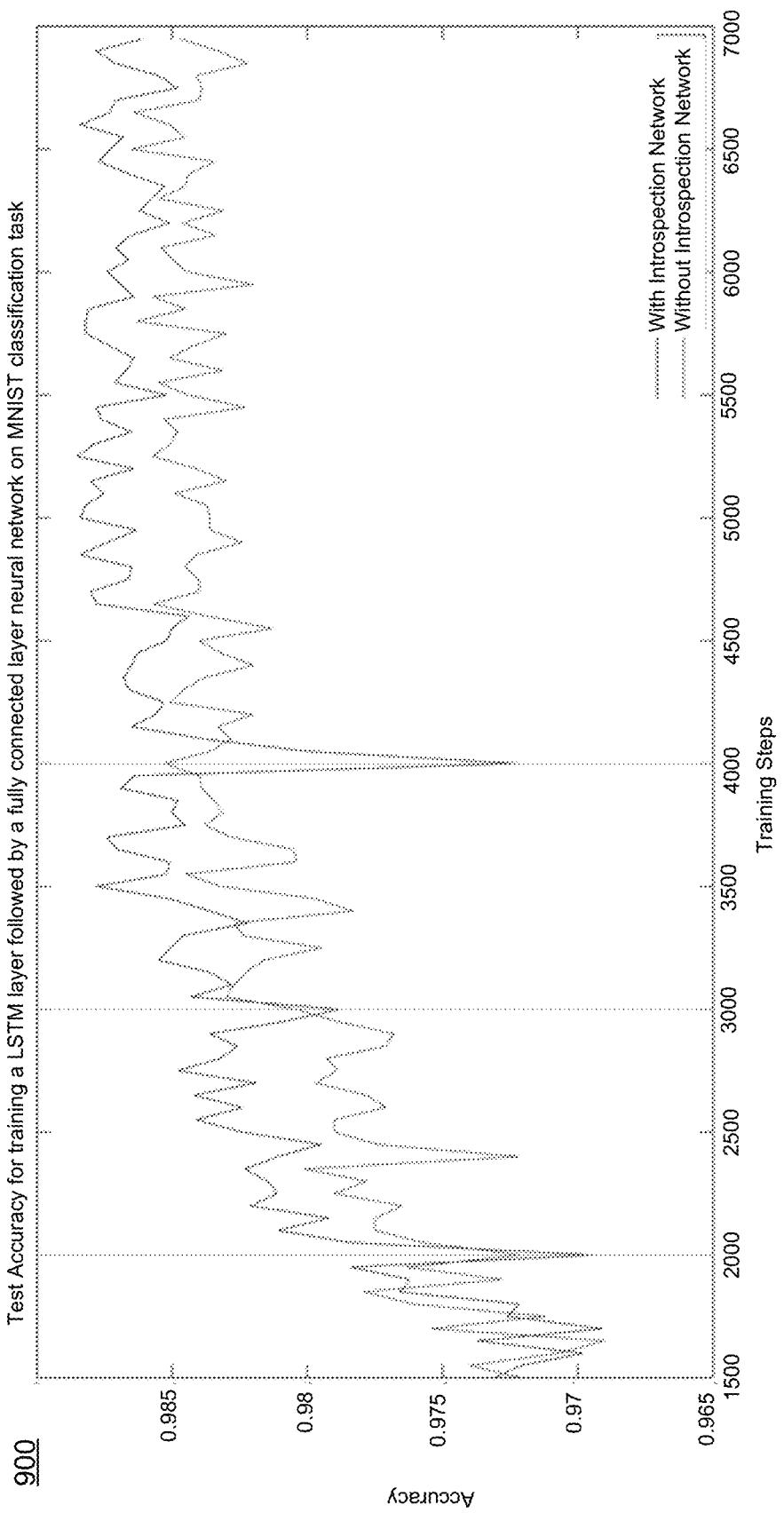

In the graph 900 of FIG. 9, the introspection network is used at (weight updates occur at) training steps 2000, 3000 and 4000. The target network being trained in the example of graph 900 is a recurrent neural network with a LSTM cell of hidden size of 128 followed by a fully connected layer of shape [128, 10]. The target network of FIG. 9 uses Adam optimization with a learning rate of 5e-4 and a batch size of 128. Because the LSTM cell of the network uses sigmoid and tan h activations, FIG. 9 illustrates how the introspection network (trained on ReLU) can generalize to networks using different activation functions. In the example of FIG. 9, after 7000 steps of training, the max accuracy achieved by normal training of the target network is 98:65%, which is achieved after 6500 steps. In contrast, training of the target network with the introspection network applied, a maximum accuracy of 98:85% achieved after 5300 steps. It is notable that the introspection network trained on weight evolutions with ReLU activations was able to help accelerate the convergence of an RNN network which uses sigmoid and tan h activations.

Figure 10:
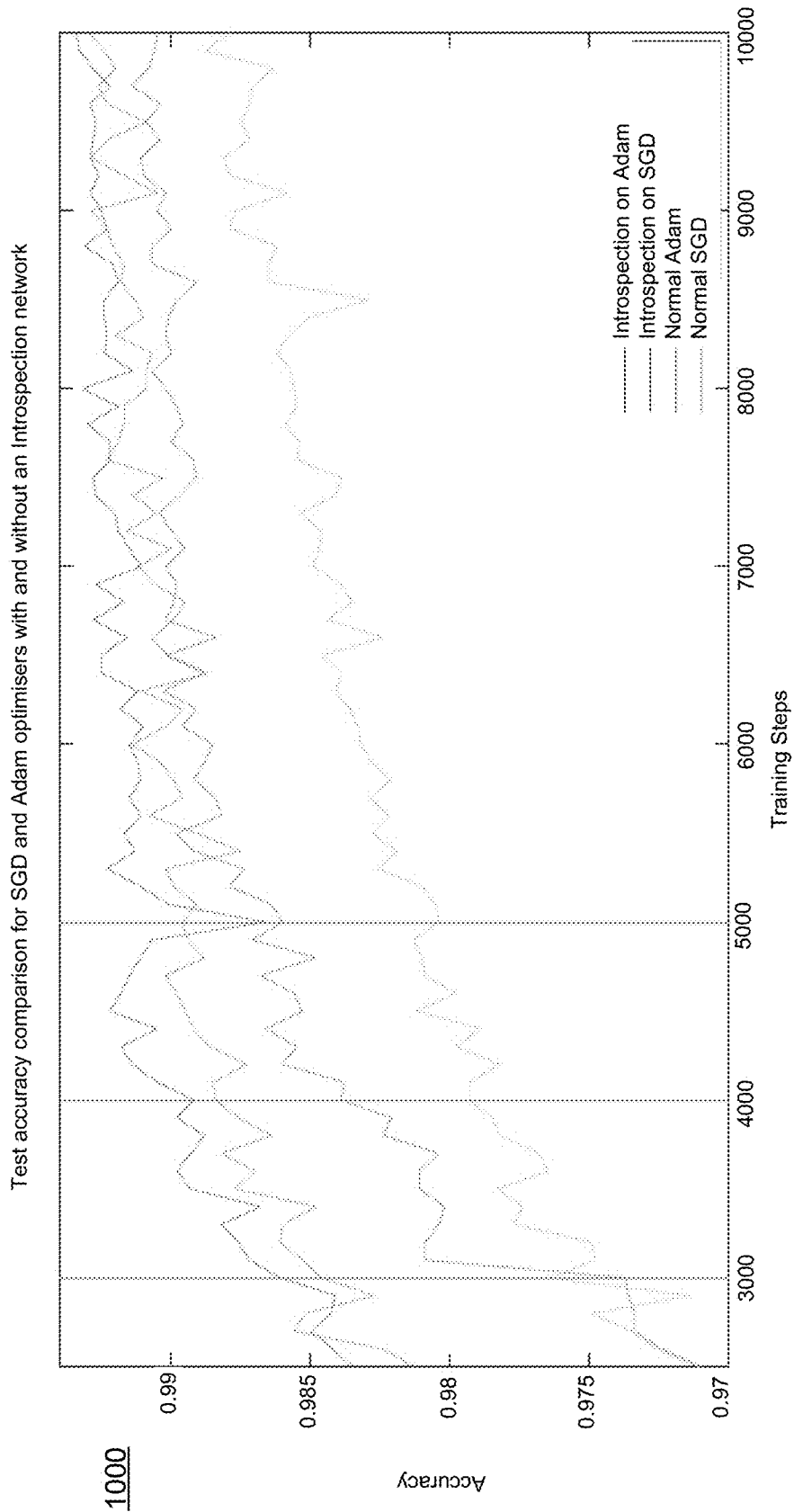
FIG. 10 is a graph illustrating test accuracy for a neural network trained with optimizers in the presence and absence of introspection, according to one example.

FIG. 10 illustrates a graph 800 of test accuracy for a neural network trained with optimizers in the presence and absence of introspection, according to one example. In the graph 1000, the configuration of the target network is the same as the target network trained in FIG. 6, except that the Adam optimizer was used with and without the introspection network. The graph 1000 illustrates that application of the introspection network also accelerates the training and accuracy of a target network trained using the Adam optimizer. For example, the application of the introspection network with Adam reaches the maximum accuracy of 99.43% at only 7200 steps, while Adam alone reaches the maximum accuracy of 99.3% at 10,000 steps.

Figure 11:
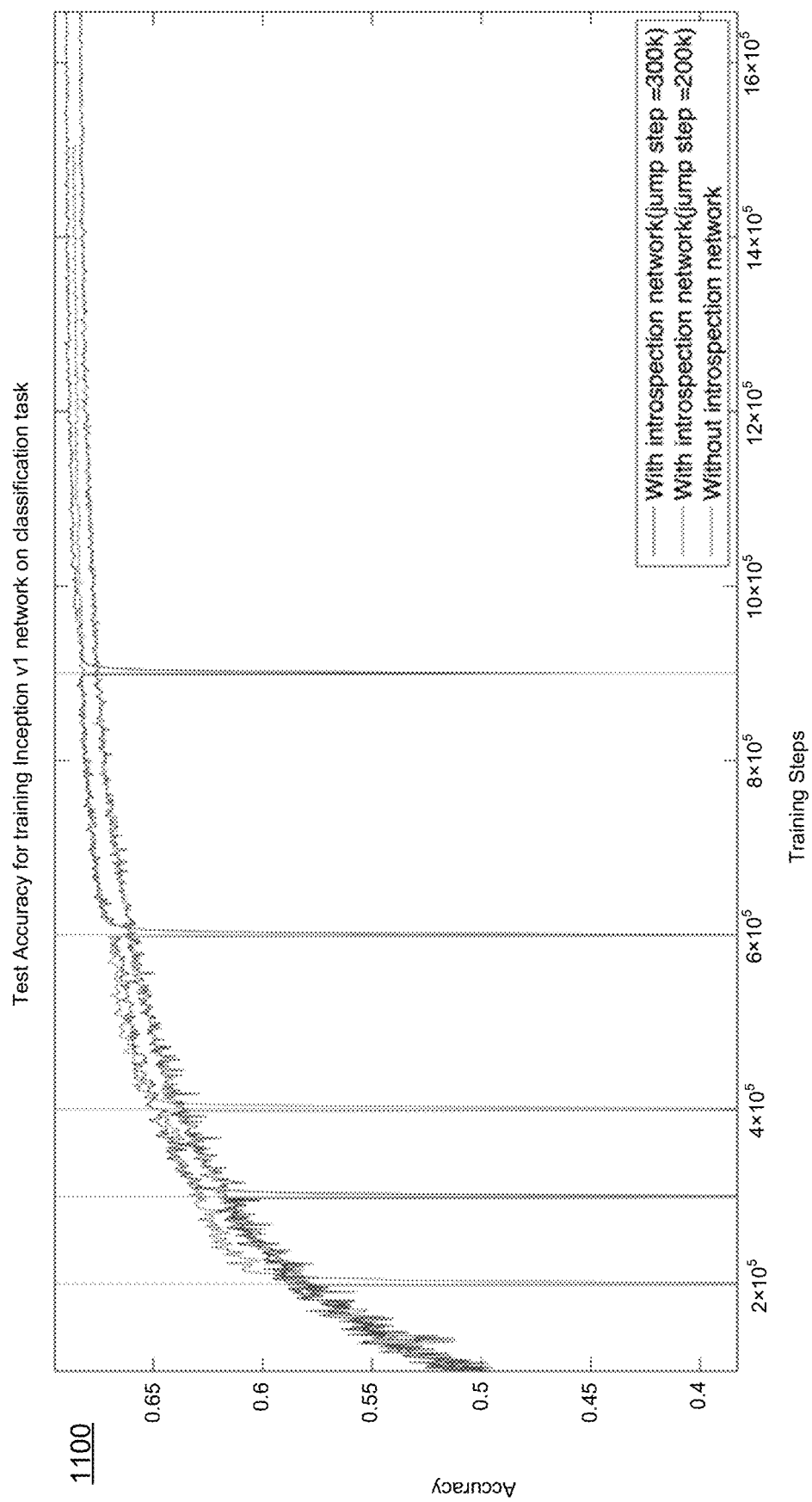
FIG. 11 is a graph illustrating test accuracy for a neural network trained in the presence of introspection applied at different jump step intervals and also in the absence of introspection, according to one example.

FIG. 11 is a graph illustrating test accuracy for a neural network trained in the presence of introspection applied at different jump step intervals and also in the absence of introspection, according to one example. The introspection network of FIG. 11 is trained on the weight evolution of MNIST network. The target network of FIG. 11 is a GoogLeNet Inception v1 network, which is a deep neural network. The target network is trained on an imagenet dataset with a mini-batch size of 128 and a RMS optimizer (decay 0.9, momentum 0.9, epsilon 1.0) starting from a learning rate of 0.01 with a decay of 0.94 after every 2 epochs. The example of FIG. 11 illustrates that applying the introspection network seems to be reducing the training time of the deep neural network quite significantly. For example, FIG. 11 illustrates that the introspection network leads to a gain of at least 730,000 steps. After training for around 1.5 million steps, the maximum accuracy achieved by normal training is 68.40%, whereas with introspection applied after every 300 k steps the max accuracy achieved is 69.06% and the accuracy of 68.40% is achieved after only 852 k steps. With introspection applied at steps 200 k, 400 k and 600 k, the max accuracy achieved was 68.69% and it reached the max accuracy achieved by the normal training of model after only 944 k steps. FIG. 11 also illustrates that choosing the jump points early in the training (e.g., 200 k vs. 300 k) does not lead to eventual gains, even though a significant jump in accuracy is observed initially.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps may also be performed in a different order than illustrated in the figures.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

According to one general aspect, a computer-implemented method is provided for training a target neural network, the target neural network learning a plurality of weights during training. The method includes obtaining a weight value history sample from the target neural network for each of the plurality of weights during a first training period for the target neural network. The method also includes providing, for each of the plurality of weights, the weight value history to an introspection neural network. The introspection neural network has been trained to provide a predicted value given the weight value history. The method also includes obtaining, from the introspection neural network, the respective predicted value for each of the plurality of weights. The method also includes setting the respective weight values to the respective predicted values prior to starting a next training period in the training of the target neural network.

According to one general aspect, a computer-implemented method includes generating training examples from a plurality of weight histories, each weight history representing one of a plurality of weights in a sample set of weights for a source neural network. Each training example is from a training step that occurs during training of the source neural network and includes a value for the weight at the training step, at least three other values for the weight for training steps occurring prior to the training step, and a value for the weight at a future step, the future step occurring after the training step. The method also includes training an introspection neural network to predict the value at the future step given the values in the training example and providing the introspection neural network for use in training a target neural network.

According to one general aspect, a computer program product is embodied on a non-transitory computer-readable storage medium and comprises an introspection neural network with instructions that, when executed by at least one computing device, are configured to cause the at least one computing device to receive a weight history at a current training step for a target neural network and for each of a plurality of weights from the target neural network. The weight history includes at least four values for the weight obtained during training of the target neural network up to the current step. The instructions are also configured to cause the at least one computing device to provide a respective predicted value for each of the plurality of weights. The predicted value for a weight of the plurality of weights being based on the weight history for the weight and representing a probable value for the weight in a future training step for the target neural network. Setting respective values for each of the plurality of weights to the respective predicted values reduces the number of training rounds needed to reach optimal values for the plurality of weights during training of the target neural network.

According to one general aspect, a system includes at least one processor and memory storing instructions that, when executed by the at least one processor, cause the system to perform any of the operations or methods disclosed herein.

What is claimed is:

1. A computer-implemented method comprising:
generating, using at least one processor, training examples from a plurality of weight histories, each weight history representing one of a plurality of weights in a sample set of weights for a source neural network, and each training example being from a training step and including:
a value for the weight at the training step,
at least three other values for the weight for training steps occurring prior to the training step, and a value for the weight at a future step, the future step occurring after the training step;

training, by the at least one processor, an introspection neural network to predict the value at the future step given the values in the training example; and providing the introspection neural network for use in training a target neural network.

2. The method as in claim 1, wherein the introspection neural network accelerates training of the target neural network by reducing the number of training steps needed to reach convergence.

3. The method as in claim 1, wherein the introspection neural network has one hidden layer.

4. The method of claim 1, wherein at least one of the three other values is an initial value for the weight.

5. The method of claim 1, wherein the source neural network has a different configuration than the introspection neural network.

6. The method of claim 1, wherein the target neural network and the source neural network have different inputs.

7. The method of claim 1, wherein the sample set includes a higher proportion of weights with high variability.

8. A computer-implemented method for training a target neural network, the target neural network learning a plurality of weights during training, the method comprising:

obtaining, using at least one processor, a weight value history sample from the target neural network for each of the plurality of weights during a first training period of the training of the target neural network;

providing, for each of the plurality of weights, the weight value history sample to an introspection neural network, the introspection neural network having been trained to provide a predicted value given the weight value history sample;

obtaining, from the introspection neural network, the respective predicted value for each of the plurality of weights for training of the target neural network; and setting, using the at least one processor, the respective weight values to the respective predicted values before starting a next training period in the training of the target neural network.

9. The method as in claim 8, wherein the target neural network uses a training optimizer during the training.

10. The method as in claim 8, wherein the target neural network uses stochastic gradient descent during the training.

11. The method as in claim 8, further comprising:
applying a scaling factor to the weight value history sample prior to obtaining the predicted value; and
reducing the predicted value by the scaling factor.

12. The method as in claim 8, further comprising:
obtaining a second weight value history sample for each of the plurality of weights during a second training period;

providing, for each of the plurality of weights, the second weight value history sample to the introspection neural network;

at a training step subsequent to the second training period, obtaining, from the introspection neural network, a second respective predicted value for each of the plurality of weights; and setting the respective weight values to the second respective predicted values before starting a next training period in the training of the target neural network.

13. The method as in claim 8, wherein the weight value history sample includes four values.

14. The method as in claim 8, wherein the training period is step t, and the weight value history sample includes, for each weight, an initial value for the weight, a value for the weight at t, and two additional values for the weight that occur between the initial value and step t.

15. The method as in claim 8, further comprising obtaining the introspection neural network from a marketplace.

16. A computer program product embodied on a non-transitory computer-readable storage medium and comprising an introspection neural network with instructions that, when executed by at least one computing device, are configured to cause the at least one computing device to:

receive, at a current training step for a target neural network and for each of a plurality of weights from the target neural network, a weight history, the weight history including at least four values for the weight obtained during training of the target neural network up to the current step; and provide, by the introspection neural network, for each of the plurality of weights, a respective predicted value, the predicted value for a weight of the plurality of weights being based on the weight history for the weight, the predicted value representing a predicted value for the weight in a future training step for the target neural network, wherein setting respective values for each of the plurality of weights to the respective predicted values reduces the number of training rounds needed to reach convergence during training of the target neural network.

17. The computer program product of claim 16, wherein the instructions that, when executed by the at least one computing device, are also configured to:

multiply each of the four values by a scaling factor; and
divide the predicted value by the scaling factor.

18. The computer program product of claim 16, wherein the introspection neural network is a neural network with one hidden layer.

19. The computer program product of claim 16, wherein the target neural network is a deep learning network.

20. The computer program product of claim 16, wherein the future training step is at least two times the current training step.

* * * * *